Figure 10:
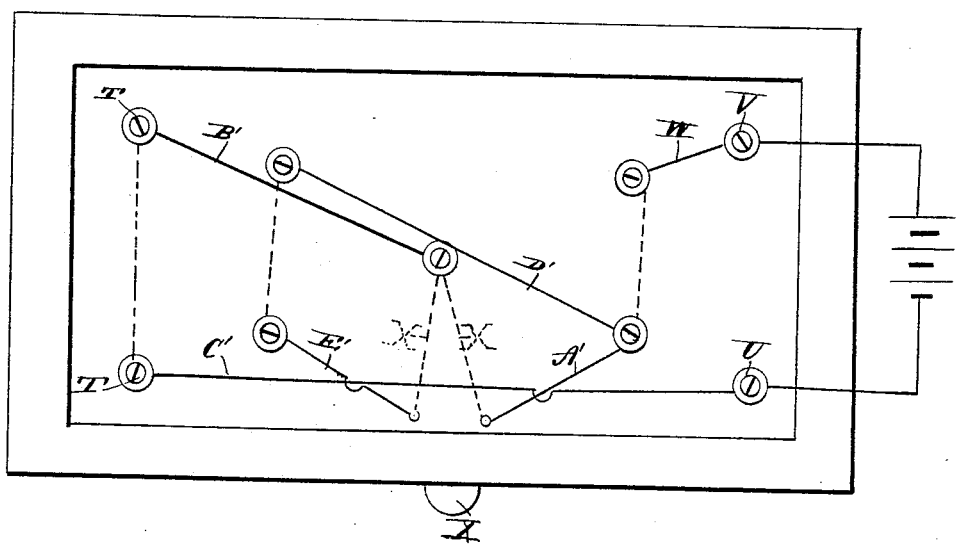

(No Model.)
D. F. SWEET.
ELECTRIC MOTOR.
No. 395,299. 3 Sheets—Sheet 1.
Patented Dec. 25, 1888.
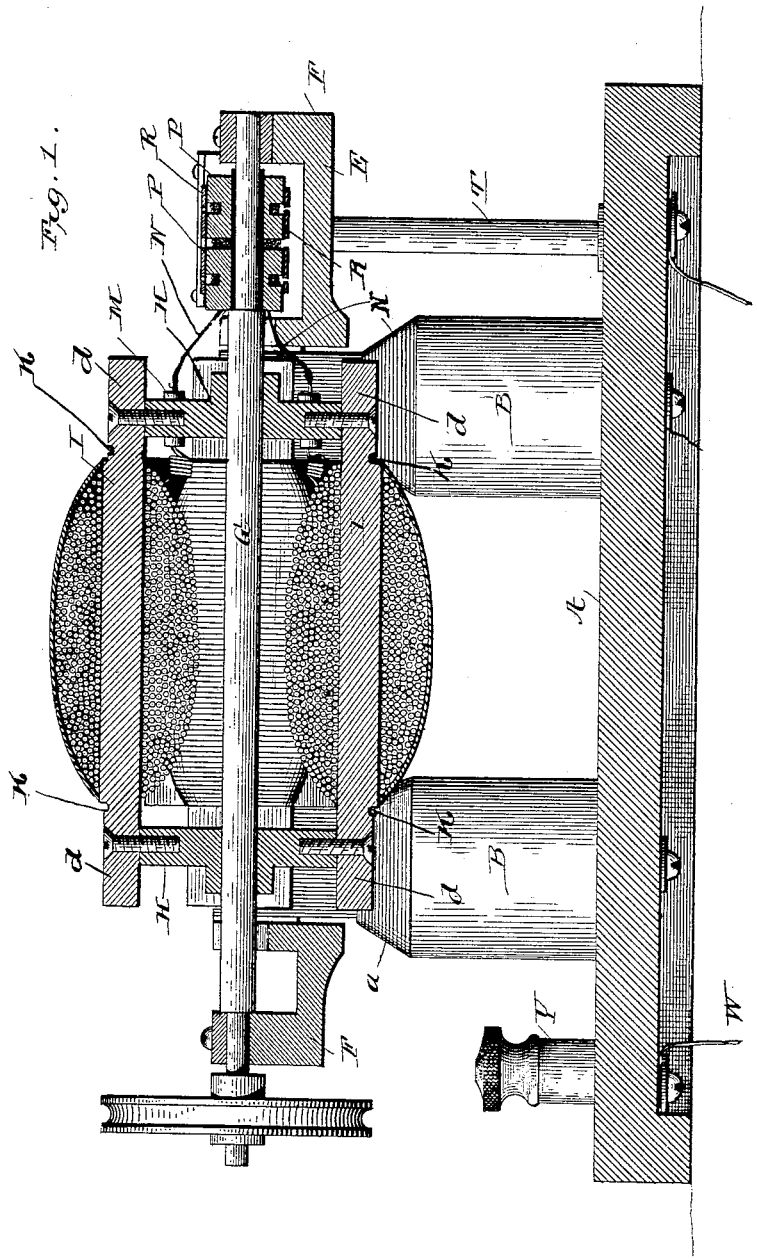
WITNESSES
Edwin T. Yewell,
John S. Faich Jr.
INVENTOR
D. Fred Sweet
By M.W. Alexander
Attorney (No Model.) 3 Sheets—Sheet 2.
D. F. SWEET.
ELECTRIC MOTOR.
No. 395,299. Patented Dec. 25, 1888.
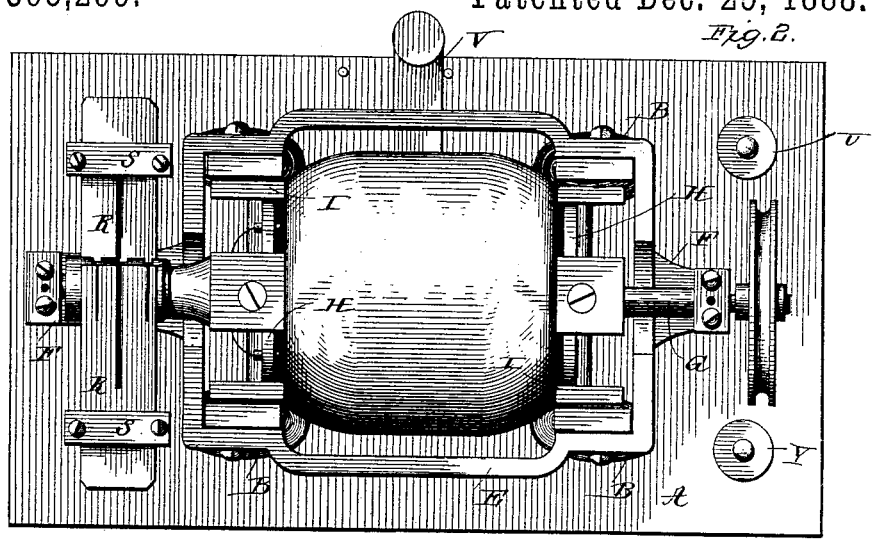
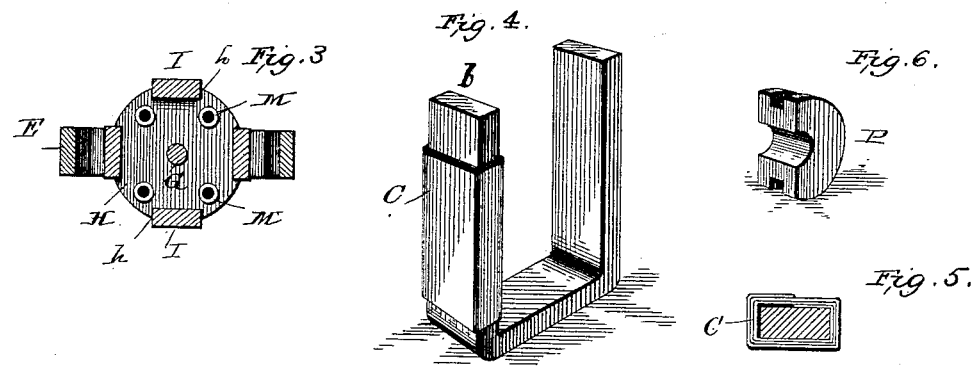
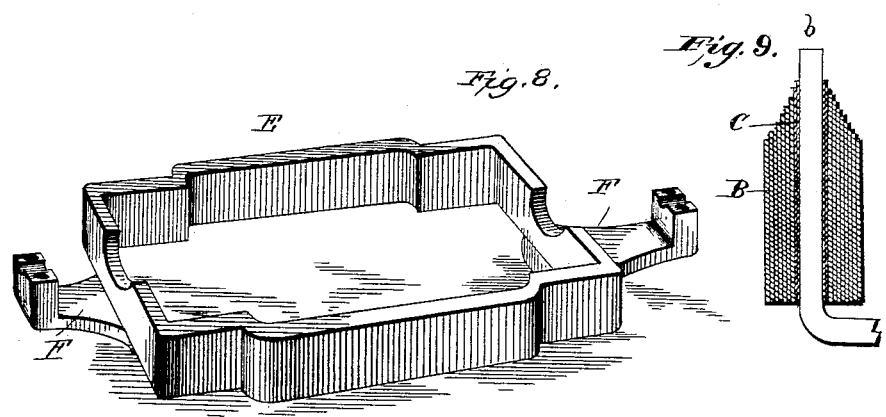

(No Model.) 3 Sheets—Sheet 3.
D. F. SWEET.
ELECTRIC MOTOR.

No. 395,299. Patented Dec. 25, 1888.

WITNESSES:

INVENTOR
D. Fred Sweet
By C. M. Alexander
Attorney

UNITED STATES PATENT OFFICE.

DANIEL FREDRICK SWEET, OF GRAND RAPIDS, MICHIGAN, ASSIGNOR TO MARCUS W. BATES, OF SAME PLACE.

ELECTRIC MOTOR.

SPECIFICATION forming part of Letters Patent No. 395,299, dated December 25, 1888.

Application filed December 15, 1887. Serial No. 258,006. (No model.)

*To all whom it may concern:*

Be it known that I, DANIEL FREDRICK SWEET, a citizen of the United States, residing at Grand Rapids, in the county of Kent and State of Michigan, have invented certain new and useful Improvements in Electric Motors, of which the following is a specification, reference being had therein to the accompanying drawings.

This invention relates to certain improvements in electric motors, or generators and motors; and it has for its objects to so arrange the rotating armatures in conjunction with the field magnet or magnets as to concentrate the magnetic forces in the field, as more fully hereinafter specified.

It is a well-known fact that the attractive force of a magnet is mainly at its polar extremities, and especially at the corner or salient points of the same, and it is also known that the attractive points in the armature also are at the polar extremities of the same and their salient points or angles. My invention is designed to render effective these well-known laws of magnetism in the construction of an electric generator or motor by so arranging the rotating armature and field-magnets, respectively, as to concentrate the lines of magnetic force between the polar extremities of the field magnet or magnets and the rotating armatures of the machine, whereby the greatest possible amount of electro-motive force is utilized and a compact and powerful machine is produced.

The invention further has for its objects to so construct the commutators as to prevent the usual spark and the consequent corrosion or burning of the surfaces of the commutator-brushes and commutator-disks, as will be more fully hereinafter explained.

The invention further has for its objects to prevent the burning out of the wires on the armatures, so that, in case of too great a current, the said wire will be burned outside of the coil, where it can be easily connected with the commutators, and obviate the rewinding of the armatures in case of injury, and the consequent taking apart and rebuilding of the machine.

The invention further relates to certain improvements in the construction of the field-magnets, whereby provision is made for more conveniently applying the coils to such magnets, the magnets are rendered more effective, and the full magnetic force of the magnet between its poles and those of the armature is utilized in inducing the currents in the coils of the armatures, and, further, to prevent counter-currents in the coils of the field-magnets by preventing the vibration of the same, due to the mutual attraction and repulsion of the said magnets and armatures; and to an improved method of mounting the magnets so that they will be magnetically insulated, and will consequently have no direct influence upon each other; and the invention still further relates to certain improvements in the construction of the armatures, by which an enlarged area of polar surface is secured, and more forcible currents induced in the coils, as will be more fully hereinafter specified.

The above-mentioned objects I attain by the means illustrated in the accompanying drawings, in which—

Figure 7:
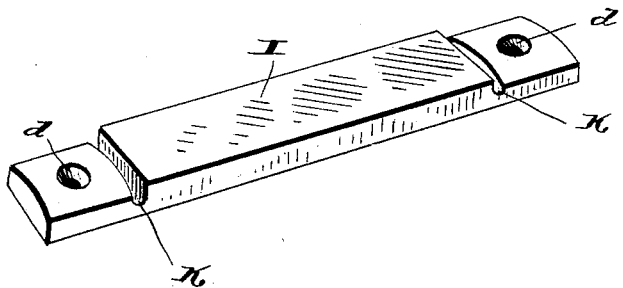

Figure 1 represents a view which is partly a section and partly a side elevation of a motor constructed according to my invention. Fig. 2 represents a top view of the same. Fig. 3 represents a sectional view of the armature and one of the supporting-heads in elevation. Fig. 4 represents a perspective view of one of the field-magnets with the coils removed, showing one of the sleeves upon which the coils are wrapped. Fig. 5 represents a transverse sectional view of one of the field-magnets. Fig. 6 is a perspective view of a section of one of the commutator-disks; Fig. 7, a detached perspective view of one of the armature-bars; Fig. 8, a perspective view of a frame or yoke which embraces the poles of the field-magnet. Fig. 9 represents a vertical sectional view of a portion of one of the field-magnets; and Fig. 10, a bottom view of the motor, showing the circuit-connections.

The letter A indicates the base of the machine, which is constructed of wood or other non-magnetic material, and B the field-magnets, which are constructed of rectangular bars *b*, of soft iron, bent, as plainly shown in Fig. 4 of the drawings, the vertical arms being surrounded with sleeves C, constructed of sheets or strips of iron coated with non-magnetic material. The said strips are wrapped around the arms of the magnets in such a manner as to expose their upper edges, a, in successive layers, one slightly above the other, for the purpose of forming a series of polar extremities. E indicates a yoke or frame, of non-magnetic material, which extends around and embraces the polar extremities of the field-magnets, and which is rigidly fastened to said magnets by means of screws or otherwise, so as to prevent the vibration of the arms of the magnets and the production of induced counter-currents in the coils of said magnets, which would interfere with the main current from the generator. The yoke or frame is provided with extensions F, having bearings at their extremities for the shaft G of the rotating armatures. The said shaft has mounted on it the disks or heads H, of non-magnetic material, the said heads being provided with rectangular seats $h$, as shown in Fig. 3 of the drawings, at suitable intervals on their peripheries for the polar extremities of the armature I, which are firmly secured to the heads or disks by means of screws or otherwise. The said armatures are rectangular in cross-section, except at their extremities, which on their outer surfaces are turned off, as shown at $d$, to a curve corresponding with that of the peripheries of the disk, the metal being grooved at the shoulders, as indicated by the letter K, so as to form magnet-poles back of the polar extremities of the armatures, the object of which is to concentrate the lines of magnetic force in the magnetic field, as will be more fully hereinafter explained, the groove $d$ in the armatures being located just at the point where such armatures begin to project from their coils, as plainly shown in Fig. 1 of the drawings. The rectangular portions of the armatures are wrapped with insulated wires, the mass in each being narrowed toward the shoulders of the armatures, forming an oval body in longitudinal section, as shown in Fig. 1 of the drawings, and the armatures, with their surrounding coils, are inclosed in a continuous wrapping of suitable material to give the whole a smooth external surface to permit the armatures to rotate with as little atmospheric resistance as possible. The wires of the armature-coils are carried out through suitable openings in the head adjoining the commutators, the openings being lined with a suitable insulating-bushing, M, the wires being coiled within the bushing, and connected at their outer ends with the wire N, leading to the commutator-disks, the said wires N being of less diameter than those of the armature-coils, so as to offer a resistance to this current at the outside of the head, by means of which the armature-wires under the influence of any excessive current will burn out at the outside of the coils instead of within the same, where the damage may be rapidly repaired by drawing out the armature-wires and reconnecting them with the commutator-wires, thus avoiding the necessity of taking apart the machine and rewinding the armatures, as would be the case if the wires should be burned or damaged within the coils.

The commutator-disks are made in sections P, as shown in Fig. 6 of the drawings. The said sections are grooved at their peripheries and secured around the armature-shaft by a wrapping of cord, thread, or other non-conducting material. The said cord does not come flush with the periphery of the disk, leaving air-spaces around the disks, which prevent the spark which usually takes place between the brushes and disks as ordinarily constructed. The commutator-brushes R are confined to the cross-heads S of the metallic posts T, which extend through the base of the machine.

The circuits, as shown in outline in Fig. 10, are as follows: The current from the battery enters the binding-post V, thence by wire W to one of the pairs of field-magnets, through the same, along wire A' to a switch, X, to wire B', to one of the posts T, to commutator-brushes and armature, to the other post T, to wire C', to post U, to battery. When the switch is moved, the current enters the post V, then passes to wire W, to one pair of field-magnets, as before, to wire D', to the other pair of field-magnets, to wire F', to switch, to wire B', to post T, to commutator-brushes and armatures, to other post T, to wire C', to post U, to battery. Thus the switch may be operated to bring one or both pairs of field-magnets into the circuit.

It will be seen that the grooves and shoulders on the polar extremities so direct the lines of force in the field that the entire electro-motive force is concentrated between the poles of the armature and field magnets, and is thereby entirely utilized.

Having thus fully described my invention, what I claim as new, and desire to secure by Letters Patent, is—

1. A field-magnet for an electric motor, consisting of a rectangular bar of iron bent as described, wound with coils of sheet-iron, as described, and having its polar extremities extended beyond the surrounding coils, so that they may extend at each side of the polar extremities of the armatures, substantially as specified.

2. An armature for an electric motor, consisting of a rectangular bar of soft iron having its ends turned off, as described, and grooved transversely at the shoulder formed by the turned portion, substantially as set forth.

3. The combination, with the armature-shaft, of the commutator-sections grooved on their peripheries and suitably insulated, the non-conducting wrappings wound in said grooves, whereby the sections are held together so as to leave peripheral air-spaces, substantially as specified.

4. The combination, with bars of the field-magnets, of the sleeves consisting of strips of sheet-iron coated with non-magnetic material and wrapped around the magnet-bars, substantially as specified.

5. The combination, with the field-magnets, of the sleeves consisting of strips of sheet-iron coated with a non-magnetic covering and having a series of successively-exposed polar edges extending above the coils of the magnets, substantially as set forth.

In testimony whereof I affix my signature in presence of two witnesses.

DANIEL FREDRICK SWEET.

Witnesses:
    FRED W. STEVENS,
    BLOSSIE SMITH.